(12) United States Patent
Koch et al.

(10) Patent No.: US 7,133,802 B2
(45) Date of Patent: Nov. 7, 2006

(54) APPARATUS AND METHOD FOR LOCATING ELECTRONIC JOB SITE PLAN FEATURES AT A JOB SITE

(75) Inventors: Roger D. Koch, Pekin, IL (US); Jeff S. Alig, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 151 days.

(21) Appl. No.: 10/894,832

(22) Filed: Jul. 20, 2004

(65) Prior Publication Data

US 2006/0020417 A1    Jan. 26, 2006

(51) Int. Cl.
*G01C 17/00* (2006.01)
(52) U.S. Cl. .................................... 702/150
(58) Field of Classification Search ................ 702/150

See application file for complete search history.

(56) References Cited

U.S. PATENT DOCUMENTS 4,807,131 A * 2/1989 Clegg .......................... 701/50
6,845,311 B1 * 1/2005 Stratton et al. ............... 701/50

* cited by examiner

*Primary Examiner*—Michael Nghiem
*Assistant Examiner*—Cindy D. Khuu
(74) *Attorney, Agent, or Firm*—Liell & McNeil

(57) ABSTRACT

In order for work, such as excavation, to occur at a job site, a job site plan with various job site features must be accurately translated to ground locations at the job site. The present disclosure locates a job site feature at a job site by storing a job site plan including at least one job site location on a computer readable data storage medium of an apparatus. An apparatus location is determined via at least one location sensor and compared to the at least one job site location. A job site locating algorithm also stored on the computer readable data storage medium is operable to indicate when the at least one job site location and the apparatus location are coincident.

19 Claims, 2 Drawing Sheets

APPARATUS AND METHOD FOR LOCATING ELECTRONIC JOB SITE PLAN FEATURES AT A JOB SITE

TECHNICAL FIELD

The present disclosure relates generally to locating features at job sites, and more specifically to a method and apparatus for locating electronic job site plan features at a job site.

BACKGROUND

In order to locate job site features, such as excavation sites, designers generally create job site plans from a survey of the job site. At the job site, the job site plan, or excavation plan, is used by a contractor or excavator operator to determine the actual ground location at which to dig. Thus, the application of the excavation plan to the ground at the job site is subjected to human error. The operator and/or contractor can not only misinterpret the ground location at which to dig, but may also be unaware of job site feature characteristics, such as buried utilities.

With the advent of accurate global positioning systems and local positioning systems, such as three-dimensional laser reference systems, job sites can now be surveyed and planned electronically. Based on an electronic survey of a job site, designers can create, with specialized software, an electronic excavation plan for the job site. The excavation plan can be downloaded onto an electronic control module within the excavator in order for the operator, while at the job site, to view the electronic excavation plan on an operator display. Although the excavation plan may provide some aid to the excavator operator during excavation, the excavation plan is insufficiently detailed by which to dig. Because the display of the excavation plan is limited to the size of the operator display, some necessary details of the plan may be difficult to view and interpret. Moreover, even if the operator display is sufficiently sized so the operator can dig from the excavation plan, the translation of the plan to the ground is still subjected to human error.

The present disclosure is directed at overcoming one or more of the problems set forth above.

SUMMARY OF THE INVENTION

In one aspect of the present disclosure, an apparatus includes at least one location sensor that is operable to sense an apparatus location. A computer processor is in electrical communication with the location sensor and a computer readable data storage medium on which a predetermined job site plan including at least one job site location is stored. A job site locating algorithm is operable to indicate when the apparatus location and the at least one job site location are coincident.

In another aspect of the present disclosure, an article includes a computer readable data storage medium. The job site locating algorithm is stored on the storage medium and is operable to indicate when a sensed location and a stored job site location within a job site plan are coincident.

In yet another aspect of the present disclosure, in order to locate a job site feature at a job site, a job site plan that includes at least one job site location is stored on a computer readable data storage medium of an apparatus. The apparatus location is determined and compared with the at least one job site location. It is indicated when the apparatus location and the at least one job site location are coincident.

DETAILED DESCRIPTION

Figure 1:
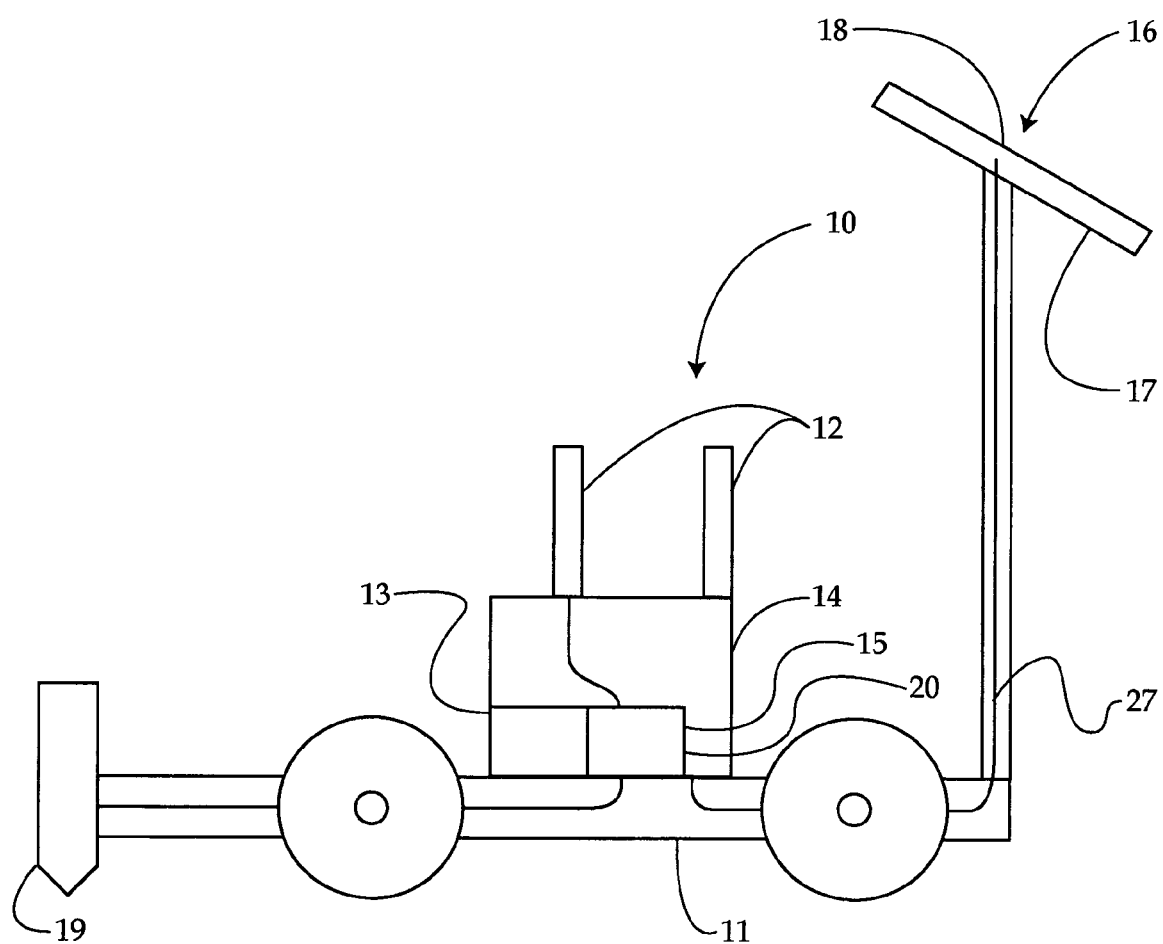
FIG. 1 is a diagrammatic representation of a job feature locating apparatus, according to the present disclosure.

Referring to FIG. 1, there is shown a diagrammatic representation of a job site feature locating apparatus 10, according to the present invention. The locating apparatus 10 includes an apparatus body 11 to which a ground engaging component, illustrated as a set of wheels, is attached. However, the present disclosure contemplates the locating apparatus without wheels and being sufficiently sized to be carried by an operator. At least one location sensor 12 that is operable to sense an apparatus location 12a (referenced in FIG. 2) is attached the apparatus body 11. Preferably, there are, at least, two location sensors 12 so that the locating apparatus 10 can indicate both the apparatus position 12a and an apparatus orientation at the job site. Although the job site location sensors 12 can include any type of sensors that together are operable to sense the location and orientation of the apparatus 10, such as a positioning system used in conjunction with an electric compass, preferably the job site location sensors 12 include global positioning system (GPS) receivers and/or local positioning system receivers. Any conventional local positioning system, such as a three-dimensional laser reference system, known in the art could be used. In the illustrated example, the location sensors 12 are both global positioning systems receivers spaced apart from one another so that the apparatus 10 can determine both its position and orientation. The global positioning systems receivers are in electrical communication with a computer processor 13 which is in communication with an article 20 that includes a computer readable data storage medium 15. In the illustrated example, both the computer processor 13 and the computer readable data storage medium 15 are included within an electronic control module 14 to the body 11 of the locating apparatus 10.

A predetermined job site plan 26 that includes at least one job site location 30 (referenced in FIG. 2) is stored on the computer readable data storage medium 15. For instance, the predetermined job site plan 26 may include an excavation plan. Although the predetermined excavation plan 26 can include any number of job site locations 30, including only one, the illustrated example includes three job site locations 30a, b, c. Those skilled in the art will appreciate that a designer created the electronic excavation plan 26 based on an electronic survey of the job site. Each job site location 30a, b, c represents a job site feature, such as a corner, a trench fetter or a buried utility, that is significant to the excavator operator's work. In the illustrated example, the locating apparatus 10 includes a selection feature that allows the operator to select the job site location 30a, b, or c that the operator wants to locate with the locating apparatus 10. Although for purposes of this discussion, the job site location 30a will be the selected job site location, those skilled in the art will appreciate that the locating apparatus 10 can locate the other site locations 30 b and c in a similar manner. Moreover, the operator need not select one job site location, but rather have the apparatus 10 search for and locate all the job site locations 30a, b, c. Each job site location 30a, b, c preferably includes a job site feature characteristic 31a, b, c (referenced in FIG. 2). The job site feature characteristics can include any aspect of the job site location of which the excavator operator should be aware. For instance, the job site feature characteristics 31 can include a buried utility line or cable, or the geometry of a hole or a gradient of a slope which is to be excavated. The job site feature characteristic 31 of the job site location 30 can include more than one aspect of the job site feature at the location 30.

The locating apparatus 10 might include a marking mechanism 19 operable to mark a ground location 25 (referenced in FIG. 2) where the sensed apparatus location 12a and the job site location 30a, b, or c are coincident. There are various types of marking mechanisms 19 that can be used in order to draw the excavator operator's attention to the marked ground location 25, such as a marking mechanism that places stakes at the ground locations. In the illustrated example, the marking mechanism 19 includes a dispenser that marks the ground locations 25 with paint. Preferably, the marking mechanism 19 is operable to mark a plurality of visually different ground locations 25a, b, c. Each visually different ground location 25a, b, c will correspond to the job site feature characteristic 31a, b, c associated with the job site locations 30a, b, c. Thus, the visual aspect of each different ground location 25a, b, c will symbolize and alert the excavator operator to the characteristic 31a, b, c of the job site features. In the illustrated example, the marking mechanism 19 is operable to mark different ground locations 25 a, b, c with different color paint in order to alert the operator to different types of buried utilities. The present invention also contemplates the marking mechanism painting the geometry of the excavation that needs to be completed.

The locating apparatus 10 is illustrated as including an operator interface 16 that includes a handle 17 and preferably a job site display 18 that is operable to indicate the apparatus location 12a relative to the job site location 30a. The job site display 18 is in communication with the electronic control module 14 via a communication line 27. Although there are various methods of displaying the relative locations 12a and 30a, in the illustrated example, the display 18 includes an outline of the excavation plan 26 highlighting the selected job site location 30a and indicating the apparatus location 12a on the plan 26. Although the locating apparatus 10 is illustrated as manually driven and guided, it should be appreciated that present disclosure contemplates the locating apparatus being integrated with a work machine, such as an excavation machine, or being a self-propelled and/or a self-guided apparatus.

Figure 2:
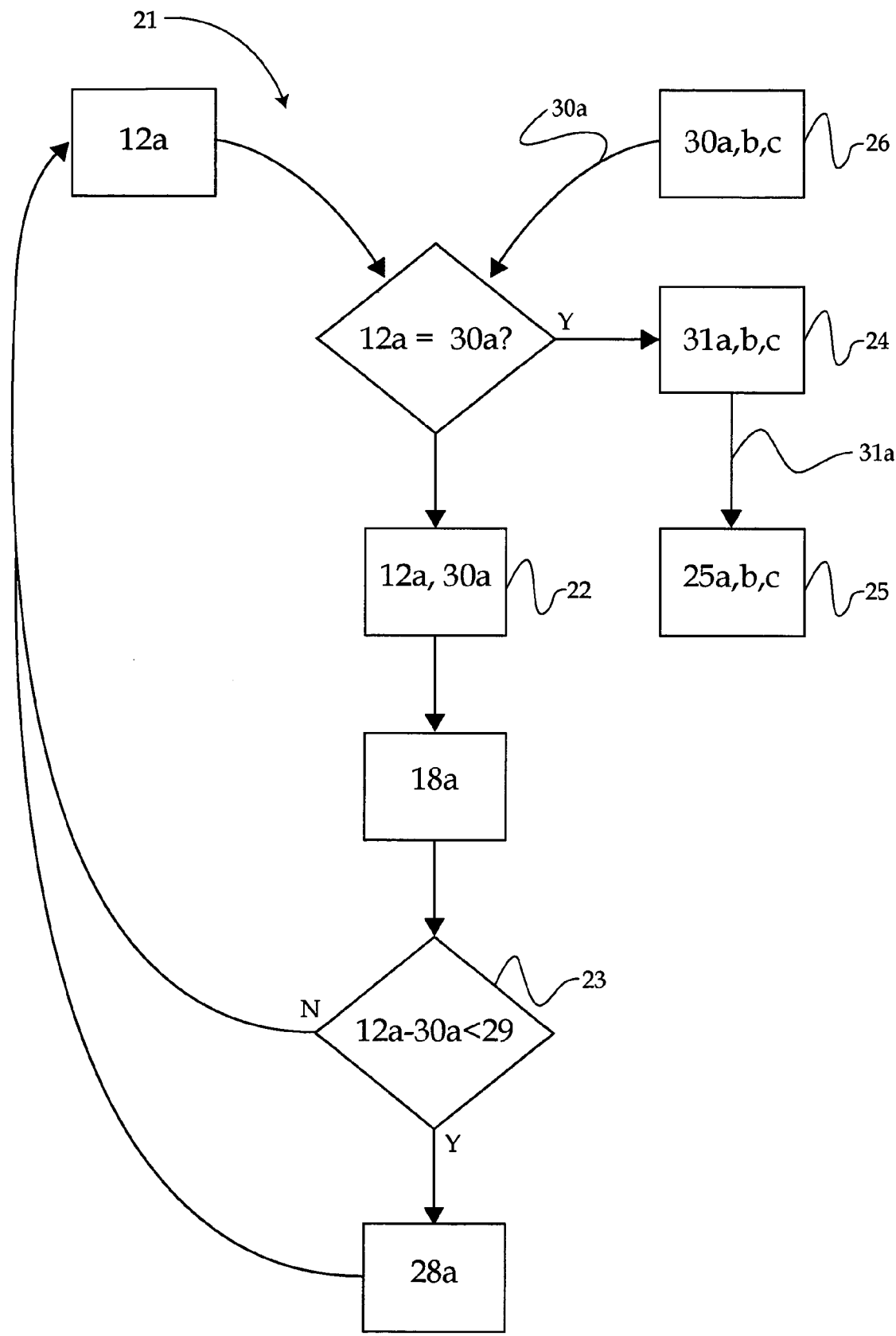
FIG. 2 is a flow chart of a job site locating algorithm, according to the present disclosure.

Referring to FIG. 2, there is shown a flow chart of a job site locating algorithm 21, according to the present invention. A job site algorithm 21 is stored on the storage medium 15 and is operable to indicate when the sensed apparatus location 12a and the selected job site locations 30a within the excavation plan 26 are coincident. Those skilled in the art will appreciate that the job site locating algorithm 21 may include a conversion algorithm that is operable to compare job site location data from the excavation plan 26 to apparatus location data received by the location sensors 12 if the job site location data and the apparatus location data were derived from two different types of location sensors. For instance, if the excavation plan 26 was designed using a local positioning system and the apparatus 10 uses the global positioning system receivers 12 to sense its location, the job site locating algorithm 21 will use methods known in the art to compare the two types of data. The job site locating algorithm preferably also includes a job site feature characteristic indicating algorithm 24 that is operable to indicate the job site feature characteristic 31 when the sensed apparatus location 12a and the job site location 30a are coincident. The job site feature characteristic indicating algorithm 24 will communicate the job site feature characteristic 31a corresponding to the job site location 30a to the marking mechanism 19. The marking mechanism 19 will mark the ground location 25a corresponding to the feature characteristic 31a. There might also be a visual or audible cue or alert to the operator, and the marking apparatus can be automatic or require manual triggering.

The job site locating algorithm 21 also includes a guiding algorithm 22 that is operable to indicate the sensed apparatus location 12a relative to the stored job site location 30a. If the job site locating algorithm 21 determines that the sensed apparatus location 12a and the job site location 30a are not coincident, preferably the guiding algorithm 22 will indicate the sensed apparatus location 12a relative to the stored job site location 30a by communicating the locations 12a and 30a to the job site display 18. Although there are various methods by which the display 18 can indicate the relationship between the locations 12a and 30a, such as providing written directions from the sensed apparatus location 12a to the job site location 30a, an activated display 18a is illustrated as including a map of the job site plan 26 with the selected job site location 30a and the sensed apparatus location 12a highlighted. The job site algorithm 21 also includes an alerting algorithm 23 that is operable to indicate when the sensed apparatus location 12a and the stored job site location 30a are within a predetermined distance 29 from one another. The predetermined distance 29 can vary, but is a distance sufficient to alert the operator that the apparatus 10 is in the proximity of the job site location 30a. The alerting algorithm 23 will indicate when apparatus location 12a and the stored job site location 30a are within the predetermined distance 29 by the activated audible and/or visual distance cue 28a.

INDUSTRIAL APPLICABILITY

Referring to FIGS. 1 and 2, a method of locating a job site feature, such as a corner, a trench or a buried utility, at the job site will be discussed using the locating apparatus 10. Although the locating apparatus 10 is illustrated as relatively compact and manually-driven, those skilled in the art will appreciate that the present disclosure would operate similarly in various other type of apparatuses, including, but not limited to, work machines, such as excavators, or self-propelled and/or self-guided apparatuses.

In order to locate a job site feature at the job site, the designer drafts the job site plan, preferably the excavation plan 26, including various job site locations 30a,b,c based on electronic surveying data from the job site. The excavation plan 26 is downloaded and stored on the computer readable data storage medium 15 within the locating apparatus 10. The operator of the locating apparatus 10 can select a specific job site location 30a, b, or c to locate or can search for all job site locations 30a, b and c. Although the present disclosure will be discussed as if the operator selected the job site location 30a to locate, it should be appreciated that the present disclosure would operate similarly if the operator were searching for all job site locations 30a, b, c. If the operator did not select a specific job site location, the apparatus 10 could begin locating job site features by locating the job site location nearest to the apparatus location 12a.

At the job site, the locating apparatus 10 can determine the apparatus location 12a by sensing the apparatus location 12a via the location sensors 12, being the global positioning system receivers, that are attached to the apparatus body 11.

The orientation the locating apparatus 10 can also be sensed by comparing positions of the two global positioning receivers. It should be appreciated that the apparatus location 12 could be sensed by various other location sensors, including, but not limited to, conventional local positioning systems. Moreover, the orientation of the apparatus 10 can be sensed by other types of sensors, including, but not limited to, an electronic compass.

Once the locating apparatus determines the apparatus location 12a, the job site locating algorithm 21 within the electronic control module 14 will compare the sensed apparatus location 12a with the selected job site location 30a. If the electronic excavation plan 26 does not include global positioning system data, but rather other types of positioning data, such as local positioning system data, the job site locating algorithm 21 will convert the local positioning system data into global positioning system data, or vice versa, by means known in the art. Thus, the electronic job site plan 26 need not to include global positioning system data in order to be included within the locating apparatus 10 with global position system receivers as location sensors 12. Those skilled in the art will appreciate that, in order to convert between two different positioning systems, the operator of the apparatus 10 may be required to initialize the locating apparatus 10 by creating a reference point prior to locating job site locations 30a, b, c.

If the job site locating algorithm 21 determines that the sensed location 12a is not coincident with the job site location 30a, the guiding algorithm 22 will preferably determine the sensed apparatus location 12a relative to the job site location 30a. The guiding algorithm 22 will communicate the relative orientation of the apparatus location 12a and the job site location 30a to the job site display 18 on the operator interface 16. The relative orientation will be indicated on the activated job site display 18a by highlighting the apparatus location 12a and the job site location 30a on an outline or map of the job site including the excavation plan 26. Based on the activated job site display 18a, the operator of the locating apparatus 10 can move towards the selected job site location 30a. Preferably, after determining the orientation of the apparatus location 12a to the job site location 30a, the alerting algorithm 23 will indicate when the sensed apparatus location 12a and the stored job site location 30a are within the predetermined distance 29 from one another. If the locations 30a and 12a are within the predetermined distance 29, the electronic control module 14 will activate the distance cue 28, alerting that the locating apparatus 10 is in relative proximity of the location position 30a. Thus, based on the indications from the guiding algorithm 22 and the alerting algorithm 23, the operator of the locating apparatus 10 will know what direction to move in order to mark the ground location 25a corresponding to the job site location 30a, and whether the locating apparatus 10 is in the relative proximity of the ground location 25a. Regardless of whether the locating apparatus 10 is in the relative proximity, the sensors 12, being the global positioning system receivers, will again sense the location of the apparatus 10 and communicate it to the job site locating algorithm 21, and the process will repeat itself until the apparatus location 12a is coincident with the selected job site location 30a.

If the job site locating algorithm 21 determines that the sensed apparatus location 12a is coincident to the job site location 30a, the job site locating algorithm 21 will indicate such. The job site locating algorithm 21 will activate the marking mechanism 19 which will mark the ground location 25a where the apparatus location 12a and the job site location 30a are coincident. The present disclosure contemplates the marking mechanism 19 including at least one of an automatic and operator requested marking mode. Thus, depending on the operator's preference, either the operator will be directed to mark the ground location 25a or the apparatus 10 will automatically mark the location 25a. Preferably, the job site feature characteristic indicating algorithm 24 will determine the job site feature characteristic 31a corresponding to the job site location 30a. The job site feature characteristic indicating algorithm 24 will indicate the job site feature characteristic 31a by activating the marking mechanism 19 to mark the ground location 25a with the marking corresponding to the characteristic 31a. For instance, if the job location feature characteristic indicating algorithm 24 determines that there is a buried gas line, the marking mechanism 19 will mark the ground location 25a with yellow paint. Similarly, the present disclosure contemplates the marking mechanism 19 painting the geometry of the trench or hole to be excavated. Thus, after the locating apparatus 10 marks the ground location 25a with the marking associated with the job site feature characteristic 31a, the excavator operator will know not only where to dig, but where not to dig and some of the characteristics of the particular dig. The operator of the locating apparatus 10 can continue to move about the job site based on the direction giving by the locating apparatus 10 until all job site locations 30a, b, c with their associated characteristics 31a, b, c are marked. It should also be appreciated that the apparatus 10 need not include a ground marking mechanism, but can rather indicate the ground locations via an audible cue or a three-dimensional holography display or special computer display glasses that superimpose the marked ground locations on the operator's view.

The present disclosure is advantageous because the disclosure provides an accurate method of locating job site features, such as trenches and ditches that need to be excavated. The job site locating algorithm 21 accurately translates the excavation plan 26 which was predetermined based on the electronic survey of the job site into marked ground locations 25a, b, c at the job site. Thus, the excavator operator can use the marked ground locations 25a, b, c to dig without concern about misinterpreting the excavation plan 26. The present disclosure reduces the risk of inaccurate digging based on misinterpretation of the excavation plan 26, which, in return, reduces the potential costs and time associated with excavating the job site.

The present disclosure is further advantageous because the disclosure provides an accurate method of alerting the excavator operator to distinctive job site feature characteristics 31. For instance, the apparatus 10 can alert operator as to dimensions of the excavation to be done and the ground locations to avoid. Again, the present disclosure reduces the risk of operator misinterpretation of the excavation plan 26 by automating the interpretation of the plan 26. In addition, the location sensors 12 can find additional uses at the job site, including, but not limited to, marking job site features and characteristics that were not on plan, such as location of temporary electric lines, and recording new locations for purpose of making electronic maps of existing job sites.

It should be understood that the above description is intended for illustrative purposes only, and is not intended to limit the scope of the present disclosure in any way. Thus, those skilled in the art will appreciate that other aspects, objects, and advantages of the disclosure can be obtained from a study of the drawings, the disclosure and the appended claims.

What is claimed is:

1. An apparatus comprising:
   at least one location sensor being operable to sense an apparatus location and being in electrical communication with a computer processor that is in communication with a computer readable data storage medium;
   a predetermined job site plan including at least one job site location and being stored on the computer readable data storage medium;
   a job site locating algorithm being operable to indicate when the apparatus location and the at least one job site location are coincident; and
   a marking mechanism operable to mark a ground location at a job site corresponding to the job site location of the job site plan.

2. The apparatus of claim 1 wherein the predetermined job site plan includes an excavation plan; and
   the marking mechanism being operable to paint a geometry of an excavation to be completed at the job site.

3. The apparatus of claim 1 wherein the at least one of location sensor including at least one of a global positioning system and local positioning system.

4. The apparatus of claim 3 including a job site display being operable to indicate the apparatus location and orientation relative to the job site plan.

5. The apparatus of claim 3 wherein the job site locating algorithm includes an alerting algorithm being operable to indicate when the apparatus location and the job site location are within a predetermined distance from one another.

6. The apparatus of claim 1 wherein the marking mechanism is operable to mark different ground locations with different color paints.

7. The apparatus of claim 6 wherein
   each different paint color corresponding to a different job site feature characteristic.

8. The apparatus of claim 1 including an apparatus body with a ground engaging component attached thereto;
   the marking mechanism being attached to the apparatus body.

9. The apparatus of claim 1 wherein the marking mechanism is operable to place a stake at the ground location.

10. The apparatus of claim 1 wherein the marking mechanism includes a paint dispenser.

11. An apparatus comprising:
    at least one location sensor being operable to sense an apparatus location and being in electrical communication with a computer processor that is in communication with a computer readable data storage medium;
    a predetermined job site plan including at least one job site location and being stored on the computer readable data storage medium; and
    a job site locating algorithm being operable to indicate when the apparatus location and the at least one job site location are coincident;
    a marking mechanism operable to mark a ground location where the apparatus location and the job site location are coincident, and the marking mechanism being operable to mark a plurality of visually different ground locations;
    each ground location corresponding to a different job site feature characteristic;
    a job site display being operable to indicate the apparatus location relative to the job site location;
    the predetermined job site plan including an excavation plan;
    the at least one of location sensor including at least one of a global positioning system and local positioning system; and
    the job site locating algorithm including an alerting algorithm being operable to indicate when the apparatus location and the job site location are within a predetermined distance from one another.

12. A method of locating a job site feature at a job site, comprising the steps of:
    storing a job site plan including at least one job site location which represents a job site feature on a computer readable data storage medium of an apparatus;
    determining an apparatus location;
    comparing the at least one job site location with the apparatus location;
    indicating when the apparatus location and at least one job site location are coincident; and
    the indicating step including marking a ground location at the job site corresponding to the job site location of the job site plan.

13. The method of claim 12 wherein the step of determining includes a step of sensing the apparatus location via at least one of a global positioning system and a local positioning system.

14. The method of claim 12 including a step of guiding, at least in part, by indicating the apparatus location relative to the job site location.

15. The method of claim 12 including a step of indicating when the apparatus location and the job site location are within a predetermined distance from one another.

16. The method of claim 12 wherein the step of marking a ground location includes a step of dispensing paint at the ground location.

17. The method of claim 16 wherein the step of marking includes a step of marking different ground locations with different colors of paint.

18. The method of claim 12 including a step of placing a stake at the ground location.

19. The method of claim 12 including a step of painting a geometry of an excavation to be completed at the job site.

* * * * *